UNITED STATES PATENT OFFICE.

ST. GEORGE T. C. BRYAN, OF BIRMINGHAM, ALABAMA.

METHOD OF TREATING SLAG.

SPECIFICATION forming part of Letters Patent No. 400,047, dated March 26, 1889.

Application filed July 25, 1888. Serial No. 280,991. (No specimens.)

*To all whom it may concern:*

Be it known that I, ST. GEORGE T. C. BRYAN, of Birmingham, in the county of Jefferson and State of Alabama, have invented a certain Improved Method of Treating Slag, of which the following is a specification.

The object of my invention is to produce a superior cellular slag of tough and elastic quality, that shall be light and strong, and adapted for building material and various other uses. In order to accomplish this object I mingle hydrogen gas and carbonic-acid gas with molten slag. The hydrogen combines with the sulphur in the slag and passes away in the form of sulphureted hydrogen. Both these gases, hydrogen and carbonic-acid gas, pass through the molten slag and intimately intermingle with it to give it a fine cellular structure. The fine cells or pores of the mass when cold will contain carbonic-acid gas and hydrogen gas, which perform important functions after the slag is applied to use by chemically combining, respectively, the hydrogen with any remaining sulphur and the carbonic-acid gas with silica and calcium of the slag. These combinations improve the quality of the slag as it becomes aged, adding to its strength and increasing its durability.

One method of carrying out my invention is to deliver molten slag, preferably as it comes from the furnace, into a receptacle in which carbon, preferably in the form of coke, is deposited and held in place. At the same time I force under the molten mass and against the carbon, which may be held down by a cage or pot, a jet or jets of steam. The effect of forcing the steam against the hot carbon is that the oxygen of the steam combines with the carbon and greatly raises the temperature, so that perfect fusion of any matter in the slag is effected. Carbonic-acid gas is thus produced and hydrogen is evolved, which gases, passing into and bubbling throughout the molten mass, intimately intermingle with it. The hydrogen gas combines with the sulphur of the slag and forms sulphureted-hydrogen gas which passes away. The result is that the sulphur is mostly eliminated from the slag by such combination. The elimination of the sulphur adds to the toughness and diminishes the brittleness of the slag, so that an exceedingly valuable light strong porous substance is produced. The intimate intermingling of the carbonic-acid and hydrogen gases, with the slag may be aided, if desired, by mechanical appliances, such as stirrers, &c. These processes may be continued until the slag is sufficiently stiff to prevent the rising and escape of the gases from it and to render it throughout uniform in composition and temperature, and prevent adhesion of the slag to the walls of the vessel.

On account of the presence of hydrogen gas and carbonic-acid gas in the pores of the slag certain chemical combinations, above referred to, take place gradually and are aided by exposure to moisture, so that the lapse of time improves the quality of the cellular product.

I am aware that steam or water has heretofore been proposed to be forced into molten slag for certain objects; but my improvement contemplates the employment of carbonic-acid gas and hydrogen, and I use steam in conjunction with carbon as one means of producing these gases and raising the temperature thereby. Other means for producing these gases and for distributing them through the slag for the objects cited may be used.

What I claim, therefore, to be new, and desire to secure by Letters Patent, is—

1. The method of treating slag herein described, for the purpose of making it cellular, which consists in forcing into it and intimately mingling with it, when in a molten state, carbonic-acid gas and hydrogen gas, substantially as set forth.

2. The method of treating molten slag herein described, which consists in placing carbon, preferably in the form of coke, in a vessel, delivering molten slag therein and forcing steam against the hot carbon for the evolution of carbonic-acid and hydrogen gases, and their distribution through the mass of molten slag to eliminate the sulphur and give the mass a porous structure, substantially as set forth.

In testimony of all which I have hereunto subscribed my name.

ST. GEORGE T. C. BRYAN.

Witnesses:
 JOSEPH L. ATKINS,
 EMMA M. GILLETT.